United States Patent
Graber et al.

(10) Patent No.: US 9,585,202 B2
(45) Date of Patent: *Feb. 28, 2017

(54) INDUCTION-BASED FOOD HOLDING/WARMING SYSTEM AND METHOD

(75) Inventors: Warren S Graber, Hoffman Estates, IL (US); Reinhard Metz, Wheaton, IL (US); Robert J Visher, Downers Grove, IL (US)

(73) Assignee: COOKTEK INDUCTION SYSTEMS, LLC, Carrollton, TX (US)

( * ) Notice: Subject to any disclaimer, the term of this patent is extended or adjusted under 35 U.S.C. 154(b) by 355 days.

This patent is subject to a terminal disclaimer.

(21) Appl. No.: 13/112,221

(22) Filed: May 20, 2011

(65) Prior Publication Data

US 2012/0294990 A1 Nov. 22, 2012

(51) Int. Cl.

| | |
|---|---|
| H05B 6/00 | (2006.01) |
| H05B 6/12 | (2006.01) |
| H05B 6/06 | (2006.01) |
| H05B 6/10 | (2006.01) |
| A47J 36/24 | (2006.01) |

(52) U.S. Cl.
CPC .............. H05B 6/12 (2013.01); A47J 36/24 (2013.01); A47J 36/2483 (2013.01); H05B 6/062 (2013.01); H05B 6/105 (2013.01); H05B 6/1209 (2013.01); H05B 2213/07 (2013.01); Y02B 40/123 (2013.01)

(58) Field of Classification Search
CPC .................................. H05B 6/00; H05B 6/12
USPC ....... 99/451; 336/15, 65, 117; 219/112, 162, 219/200, 600, 108, 632, 608, 618, 621, 219/620, 624, 630, 622, 627
See application file for complete search history.

(56) References Cited

U.S. PATENT DOCUMENTS

| | | | |
|---|---|---|---|
| 3,615,365 A | | 10/1971 | McCunn |
| 3,732,504 A | * | 5/1973 | Levinson ........................ 331/86 |
| 3,761,667 A | * | 9/1973 | Walden ................. H02M 7/523 |
| | | | 219/625 |
| 3,966,426 A | | 6/1976 | McCoy et al. |
| 4,464,553 A | | 8/1984 | Ikeda |
| 4,529,869 A | | 7/1985 | Ekstrom, Jr. |
| 4,549,056 A | * | 10/1985 | Okatsuka et al. ............ 219/626 |
| 4,596,236 A | | 6/1986 | Eide |
| 4,646,935 A | * | 3/1987 | Ulam ......................... 220/573.1 |
| 4,749,836 A | | 6/1988 | Matsuo et al. |
| 4,820,891 A | | 4/1989 | Tanaka et al. |

(Continued)

FOREIGN PATENT DOCUMENTS

| | | |
|---|---|---|
| EP | 0919326 A1 | 6/1999 |
| KR | 1020130094639 A | 8/2013 |

OTHER PUBLICATIONS

British Stainless Steel Association, Frequently Asked Question Page, Is stainless steel non-magnetic?, located at: http://www.bssa.org.uk/faq.php?id=24, accessed Dec. 23, 2013.*

(Continued)

*Primary Examiner* — David Angwin
*Assistant Examiner* — Michael Laflame, Jr.
(74) *Attorney, Agent, or Firm* — Michael Best & Friedrich LLP

(57) ABSTRACT

A system and method for holding and warming food held in pans or trays having a low relative magnetic permeability, such as 300-series stainless steel, using induction heating.

24 Claims, 17 Drawing Sheets

(56) References Cited

U.S. PATENT DOCUMENTS

| | | | |
|---|---|---|---|
| 5,134,265 A | 7/1992 | Dickens et al. | |
| 5,270,511 A * | 12/1993 | Iguchi | 219/667 |
| 6,894,255 B2 | 5/2005 | Fujii et al. | |
| 6,904,378 B2 * | 6/2005 | Schilling et al. | 702/99 |
| 7,355,150 B2 | 4/2008 | Baarman et al. | |
| 7,688,036 B2 * | 3/2010 | Yarger et al. | 320/137 |
| 7,731,689 B2 | 6/2010 | Prisco et al. | |
| 7,790,103 B2 | 9/2010 | Shah et al. | |
| 7,980,171 B2 | 7/2011 | Groll | |
| 8,021,768 B2 | 9/2011 | Ge | |
| 2002/0027175 A1 | 3/2002 | Capp | |
| 2003/0062362 A1 * | 4/2003 | Tateishi | 219/508 |
| 2003/0192881 A1 * | 10/2003 | Bassill et al. | 219/626 |
| 2004/0070482 A1 * | 4/2004 | Golan | 336/223 |
| 2004/0112940 A1 | 6/2004 | Caddell, Jr. et al. | |
| 2004/0149736 A1 * | 8/2004 | Clothier | 219/627 |
| 2005/0045624 A1 | 3/2005 | Groll | |
| 2005/0271894 A1 | 12/2005 | Groll | |
| 2006/0081615 A1 | 4/2006 | Kataoka et al. | |
| 2006/0272494 A1 * | 12/2006 | Cetinkunt et al. | 91/459 |
| 2006/0289487 A1 | 12/2006 | Tarenga | |
| 2007/0000915 A1 | 1/2007 | Cheng | |
| 2007/0267107 A1 | 11/2007 | Michler | |
| 2009/0065500 A1 | 3/2009 | England et al. | |
| 2009/0194329 A1 * | 8/2009 | Guimerans et al. | 175/17 |
| 2009/0321425 A1 * | 12/2009 | Meier | 219/621 |
| 2010/0012232 A1 | 1/2010 | John | |
| 2010/0108690 A1 | 5/2010 | Groll | |
| 2010/0230401 A1 * | 9/2010 | Miyauchi et al. | 219/665 |
| 2011/0180531 A1 * | 7/2011 | Shinha | 219/630 |
| 2012/0024840 A1 | 2/2012 | Lee et al. | |
| 2012/0138597 A1 | 6/2012 | Quella et al. | |
| 2012/0268117 A1 * | 10/2012 | Romano et al. | 324/307 |

OTHER PUBLICATIONS

CookTek Induction Systems, LLC; 650 Watt Drop-In Induction Buffet specifications.
The Webstaurant store; http://www.webstaurantstore.com/5305/steam-tables-and-cold-food-tables-wells.html.
U.S. Appl. No. 14/314,931 Non-final Office Action mailed Aug. 26, 2014 (7 pages).
Therma-Kool, "CookTek Induction Systems SinAqua Induction Food Holding Wells", < http://fesmag.com/products/product-showcase/serving-equipment/cooktek-induction-systems-sinaqua-inductionfood-holding-wells-detail> Accessed on Nov. 26, 2014.
Food Service Consultants Society International, Mar. 2012—Direct Connection, <http://www.fcsi.org/?201203DirectConnect> Accessed on Nov. 26, 2014.
Kim Ann Zimmermann, "The heat is on: heated merchandisers are becoming more flexible, energy efficient and stylish; Heated Merchandisers", Feb. 1, 2011, p. 145(4); vol. 77; No. 2; ISSN: 1094-1088.
Bob Ingram, "Foodservice Equipment Trends: Advances in Hot Foods, Warewashing, Scales, and More," Jun. 30, 2010, Progressive Grocer, pp. 1-2.
Bob Ingram, "The simple life," Oct. 1, 2006, Progressive Grocer, pp. 1-6.
Anonymous, "How the steam table turns," Foodservice Equipment & Supplies Specialist; Sep. 25, 1996; 49, 10; ABI/INFORM Complete, p. 79.
Snyder et al., "Correct hot and cold food holding," Foodservice Equipment & Supplies; Jul. 2000; 53, 8; ABI/INFORM Complete, p. 49.
Frable, Foster, Jr., "Good riddance to stainless-steam-table pans for hot-food display; bring on new methods," Nation's Restaurant News; Oct. 18, 1999; 33, 42; ABI/INFORM Complete, p. 29.
Frable, Foster, Jr., "Innovation leads to a better way to maintain foods' taste, temperature on holding systems," Nation's Restaurant News; Aug. 21, 2006; 40, 34; ABI/INFORM Complete, p. 18.
Vollrath, Steam Table Pans, (18 pages).
Vollrath, Catalog Countertop Warming, pp. 34-76.
Foodservice Equipment Reports, "Gallery: Induction," Feb. 3, 2014, (3 pages).
Foodservice Equipment Reports, "Mar. 2013 Products, An oil filtration system, induction food holding wells and a knife storage system are featured this month" Mar. 1, 2013, (3 pages).
Pac Rim Blogger, "Cooktek's SINAQUA Induction Holding Well System Makes TopTen Finalist in the FCSI Showcase,"Pacific Rim Rep Group, Inc., Apr. 20, 2012.
National Restaurant Association, "National Restaurant Association Announces 2012 Kitchen Innovations Award Recipients, Esteemed Award Honors Industry's Groundbreaking Foodservice Equipment In An Exclusive Pavilion at NRA Show," Feb. 8, 2012, (3 pages).
The Vollrath Company, "The Vollrath® Company Acquires Polar Ware®/Stoelting®, Acquisition Extends Vollrath's Offering in Array of Foodservice Categories," May 21, 2012.
Vollrath, "Countertop Warming and Display Equipment," Accessed on Nov. 26, 2014 (3 pages).
Vollrath, "Mirage® Induction Rethermalizer FAQs," Accessed on Nov. 26, 2014 (2 pages).
Neils, "Wells MOD-300TDM," < http://www.missionrs.com/wells-mod-300tdm-drop-in-food-warmer-3-well-fullsize-208-240v.html>, Accessed on Nov. 26, 2014 (3 pages).
Duke Manufacturing, "Drop-Ins/Slide-Ins," <http://www.dukemfg.com/products/Default.aspx?category=WEBSITE_DROP_INS>Accessed on Nov. 26, 2014 (4 pages).
Vollrath, "Vollrath's Direct Contact Heating System Warms More Efficiently," Dec. 24, 2012.
Eagle Group, "Hot Food Tables," 2013 (16 pages).
Winston Industries, "Winston Industries Expands Product Line with SerVap," May 18, 2006, (1 page).
Winston Industries, "Winston Industries Expands Product Line with SerVap," Oct. 2007, (1 page).
Thermaduke, Well Waterless Food Warmer Serving Counter Model E-3 SR, Accessed on Nov. 26, 2014 (6 pages).
Duke Manufacturing, "DRI-Channel Units for Hot Holding," Accessed on Nov. 26, (1 page).
McGuire, "A Really Easy Way to Make Commercial Steam Tables Energy Efficient," eTundra.com, Jul. 13, 2012.
Alto-Shaam, Inc., Food Wells, < http://products.alto-shaam.com/c-13-food-wells.aspx>, Accessed on Nov. 26, 2014 (2 pages).
Alibaba.com, Buffet Induction Food Warmer/Table Top Food Warmer, Accessed on Nov. 26, 2014 (3 pages).
Vollrath, Induction Buffet Table, <http:vollrath.com/Induction-Buffet-Table-1344.htm?PrintPage=yes&FB_Values=&&&> Accessed on Nov. 26, 2014 (3 pages).
Bendall, "How to buy holding and serving equipment," Dec. 14, 2012 (2 pages).
Bendall, "Buying Buffet Equipment," Jun. 1, 2009 (3 pages).
Bendall, "How to Buy Buffet Equipment," Oct. 1, 2011 (2 pages).
Bendall, "High Speed Cooking," Jul. 1, 2010 (3 pages).
Ingram, "More of the Green Stuff," Mar. 2011 (5 pages).

* cited by examiner

INVERTER AND CONTROL BLOCK DIAGRAM

RECTANGULAR UNIT

RECTANGULAR UNIT WITH PAN

RECTANGULAR UNIT INVERTERS

ROUND UNIT

RTD ASSEMBLY

RTD ASSEMBLY PLEATED SEAL

INDUCTION-BASED FOOD HOLDING/WARMING SYSTEM AND METHOD

BACKGROUND OF THE INVENTION

The present invention generally relates to typical food service, food-holding/warming systems employing a hot water steam bath with food tray/dish inserts. This system replaces the water/steam approach with an induction heating system.

Typical food service, food-holding/warming systems use food tray/dish inserts heated from below by a hot water steam bath, termed a "steam table." Steam tables have proven effective, but have several disadvantages. Given the thermal inertia of the water, the steam is relatively slow to heat the food, and the temperature can be difficult to predict and control. Replenishment of the water, and particularly availability of gas if the steam tables are gas-driven, can also be an issue given the locale (e.g., an airport, remote location, etc.). Other disadvantages of steam table systems are the requirement for a water supply and associated drainage. Additionally, the induction system is substantially more energy efficient than the hot water/steam approach.

Food holding/warming systems typically use a variety of stainless steel pans, trays, bowls, etc. Existing steel pans are typically made of Austenitic 300-series stainless steel (particularly 303 stainless) because of its corrosion resistance, a NSF requirement. These are, commonly known in the cooking industry, as well as from a physics/materials point of view, as being non-magnetic. Induction heating/cooking inherently assumes and relies upon the use of magnetic material in pots, pans, etc. For example, if stainless steel is used, then induction heating/cooking would presume the use of cookware thought of as "magnetic," such as 400-series stainless steel.

For these reasons, food service pans, typically made of 300-series stainless steel (specifically, 303), has not been heated using induction heating methods. This appears to have led the induction-cooking product industry to assume that an inherent incompatibility exists between service pans and the use of induction heating.

Additionally, in food holding/warming applications, it is often desired to use equipment that is as quiet as possible, given the presence of customers in this environment. Virtually all induction cooking equipment employs fans for cooling of the electronics, given the heat generated by the inverters and induction coils. The elimination of the need for fans is another advantage of the present invention.

Accordingly, it would be advantageous to provide apparatus, systems and a method for holding and warming food which is quiet and which provides efficient, fast and predictable heating control.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Magnetic permeability" means the measure of the ability of a material to support the formation of a magnetic field within itself, i.e., the degree of magnetization that a material obtains in response to an applied magnetic field. Permeability is the inductance per unit length. In SI units, permeability is measured in henries per metre (H m$^{-1}$), or newton per ampere squared (N A$^{-2}$).

"Relative magnetic permeability" means the ratio of the magnetic permeability of a material to the permeability of a vacuum, which is 1.0.

SUMMARY OF THE INVENTION

The objects mentioned above, as well as other objects, are solved by the present invention, which overcomes disadvantages of prior food warming/holding systems and method, while providing new advantages not previously obtainable with such systems and methods.

One preferred embodiment includes a system and a method for holding and warming food, in which a pan or tray for holding and warming the food is made of a material with a low relative magnetic permeability, such as less than about 20, such as cold-worked, 303 stainless steel, and in which the pan or tray is heated using an induction heating unit. In one preferred step of induction heating, an induction inverter is used which operates in a preferred frequency range of about 40-60 kHz.

Preferably, the induction heating circuit includes an induction coil having a sufficiently large number of coil turns so as to increase the magnetic field strength to a level sufficient to induce a desired heating temperature into the pan or tray. Most preferably, the induction coil may have in the range of about 40-80 turns, and a wire gauge in the range of about 14-18 gauge.

Most preferably, the step of induction heating occurs at a sufficiently low coil current to minimize internal heat generation in the induction unit, enabling induction heating without the need for a cooling fan. For example, the current in the induction coil may be less than about 15 amperes.

The temperature of the pan or tray may be measured using a temperature sensor such as a resistive thermal device (RTD). The measured temperature may be used in a closed loop control to limit and maintain the temperature of the pan or tray at a desired value. Preferably, the measured temperature may be used to generate a ramped inverter power profile, avoiding the generation of hot spots and facilitating lateral heat transfer in the pans or trays.

Preferably, the RTD may be mounted beneath the pan or tray in a manner to facilitate maintaining contact with the pan or tray despite variations in shape or size of the pan or tray.

In one preferred embodiment, the induction heating unit includes an inverter power circuit, power circuit controls, and an inverter resonant circuit having an induction coil and a resonant capacitor. In a preferred embodiment, the induction coil has about 40 or more turns when using 120 volt coils, and has about 75 or more turns when using 240 volt coils. In this embodiment, the inductance of the heating unit coil may be about 250 μHenries or more when using 120 volt coils, and about 800 Henries or more when using 240 volt coils. The inverter resonant circuit may be about 5-11 amps for 120 volts, and about 4-8 amps for 240 volts.

In another preferred embodiment, a system for warming food in a pan or tray made of 300-series stainless steel by induction heating is provided. This system may include an induction unit with a master controller. One or more remote control units including one or more slave units may be provided, with each of the one or more remote control units being associated with one of the pans or trays. Serial communication architecture may be provided, which may include a communication bus enabling the transfer of data between the master and slave units. The master controller may be enabled to induct heat to a series of the pans or trays in a controlled fashion using one or more of the slave units.

In a particularly preferred embodiment of this system, the communication architecture may use at least four data lines, at least one of which is bi-directional, and at least first and second control signals. The communication bus may use a standard Ethernet cable to connect the master controller to each of the one or more slave units. The first control signal may latch the address of the data being sent by the master controller to the one or more slave units. The second control signal may latch the actual data being sent by the master controller to the one or more slave units. When the first and second control signals are in an opposing state, the master controller can use at least three of at least the four data lines to request that one bit of data be returned from one or more of the slave units. At least three of the data lines may be used to select a bit of date requested by the master controller. The slave units may include a programmable device that allows discrete logic to be configured internally and combined with an integrated microprocessor.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

Figure 1:
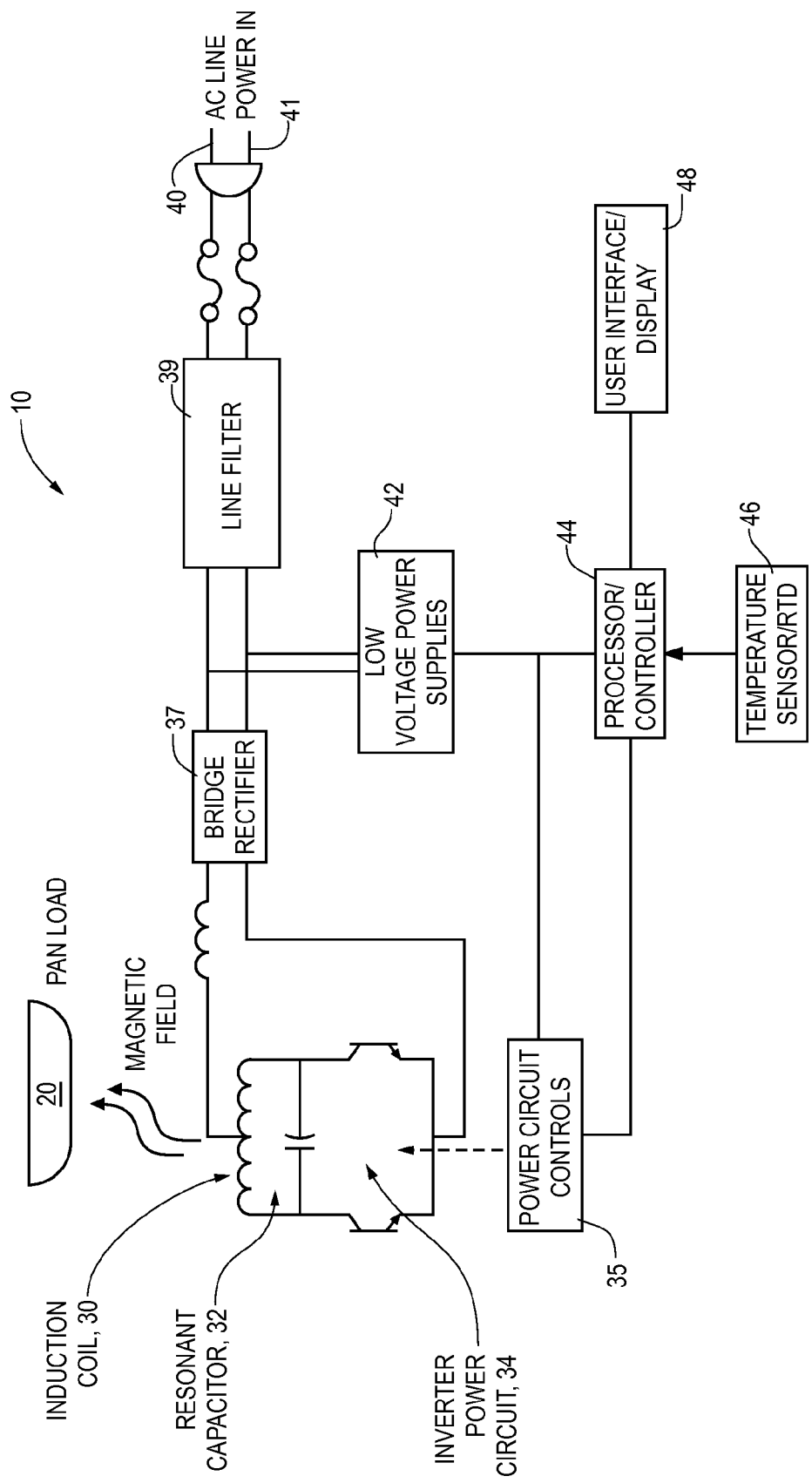
FIG. 1 is a block diagram of an inverter and controls which forms a preferred embodiment of the present invention.

The components in the drawings are not necessarily to scale, emphasis instead being placed upon clearly illustrating the principles of the present invention.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

It has been discovered that the cold working process of forming pans out of 300-series stainless material (particularly 303 stainless) includes the side effect of making the material slightly magnetically susceptible. This slight magnetism is not sufficient for effective induction heating using conventional induction methods. However, it was also discovered that by modifying the induction inverter, induction may be used to more efficiently heat pans made of 300-series stainless steel (such as, specifically, 303 stainless), particularly when only warming or holding is required. The method generally consists of two elements: 1) operating at a higher frequency than most induction cooking inverters employ (i.e., while typical induction cooking involves operating at 20 khz-30 khz, it was found that operation in the 40 khz-60 khz region results in greater losses (more heating) in the pans); and 2) employing greater numbers of coil turns, yet combined with lower currents to generate stronger magnetic fields with the induction coil than typically used, also generating greater losses in the pans.

In electromagnetism, permeability is the measure of the ability of a material to support the formation of a magnetic field within itself. In other words, it is the degree of magnetization that a material obtains in response to an applied magnetic field. Permeability is the inductance per unit length. In SI units, permeability is measured in henries per metre ($H\,m^{-1}$), or newton per ampere squared ($N\,A^{-2}$). Relative permeability is the ratio of a material's permeability to the permeability of a vacuum, which is 1.0. Materials used for induction-compatible cooking vessels have relative permeabilities in the range of 100 to a few thousand. Non-cold-worked 303 stainless steel has a relative permeability near 1, while cold work processing may increase its permeability in the range of 5 to 20. For example, the permeability of cold worked 303 stainless steel is typically one tenth to one twentieth that of 430 stainless steel, which often is used as an inducible material in cookware.

The method of the present invention used to eliminate noisy fans typically employed in conventional induction heating systems is to significantly lower the current in the resonant tank of the induction unit/inverter. Heating of a pot or pan is the result of current flowing in the pot/pan, which is in turn induced by the coil in the induction unit. The higher the current, the greater the heating. From the point of view of the induction unit and its coil, the current induced in the pot/pan is proportional to the magnetic field intensity. This, in turn, is in proportion to the product of coil current (amps) and coil turns (T) or ampere-turns. Thus, the same field strength can be created by a variety of pairings of current and coil turns.

Conventionally, induction units are designed with high coil currents, and as few turns in the coil as possible. Heat, in the electronics and coil, is primarily the result of current, as well as switching losses. The inverter we used has virtually no switching losses, and minimizes the resonant circuit current. Thus, to generate a sufficiently strong field, the number of coil turns is greatly increased as compared to typical units. This also allows thinner, cheaper coil wire to be used, as well as less expensive resonant capacitors in the inverter. The net result is that so much less heat is generated by the electronics, that no fan is required to cool them, providing a system that runs more quietly and efficiently.

Figure 16:
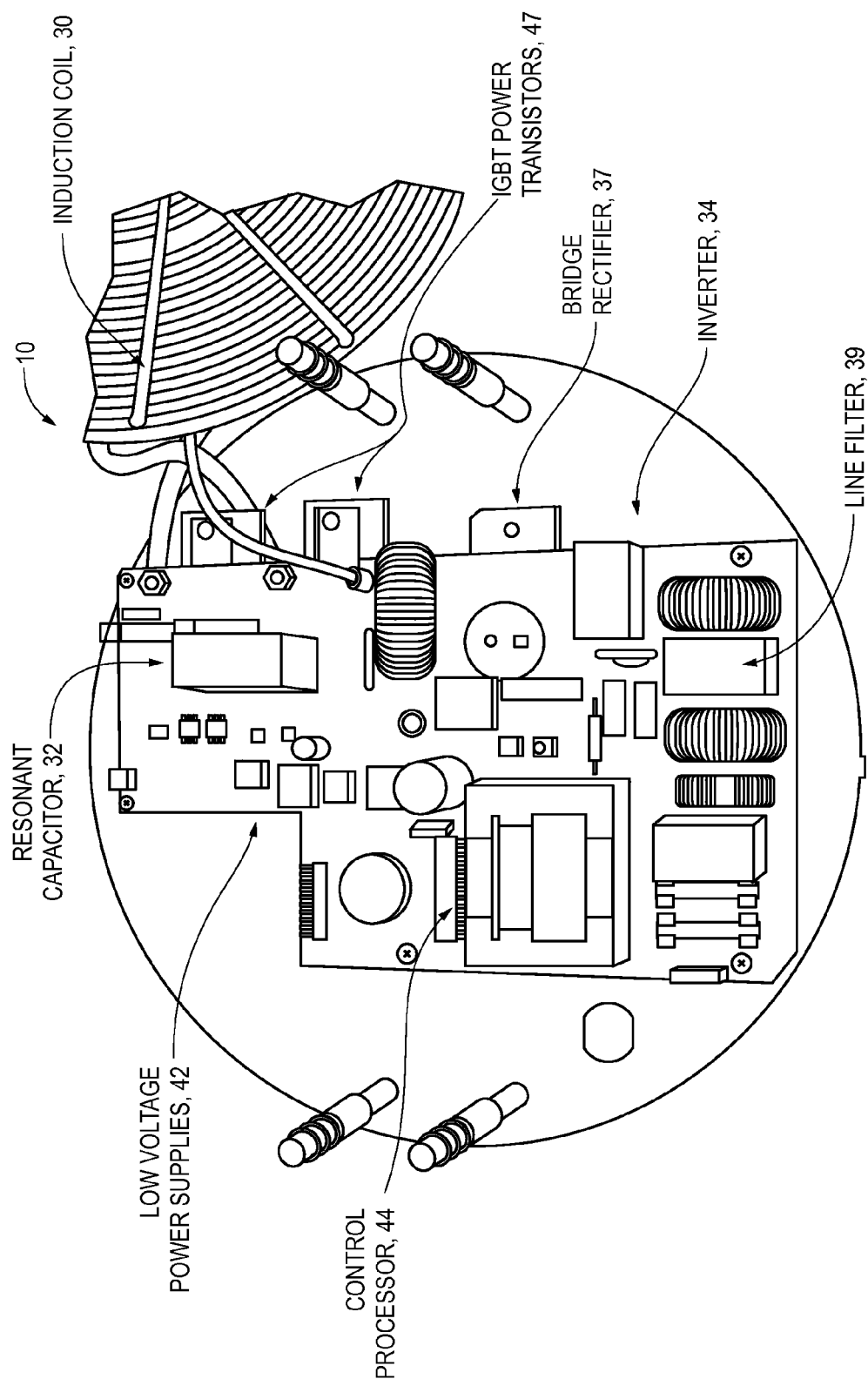
FIG. 16 is a partial, enlarged perspective view showing an exemplary parts assembly inside a preferred round induction heating unit.

Referring to FIG. 1, a schematic diagram showing one preferred inverter circuit 10 including various controls is provided. Thus, for heating a pan or tray 20, inverter circuit 10 may be used, and may generate a magnetic field (as shown by the double arrows) to heat the pan or tray 20. Inverter circuit 10 may include: inverter power circuit 34 (including induction coil 30, resonant capacitor 32 and power circuit controls 35); bridge rectifier 37; line filter 39, connected to AC power lines 40 and 41; low voltage power supplies 42; processor/controller 44; temperature sensor/RTD 46; and user interface/display 48. Referring to FIG. 16, an exemplary induction heating unit shows various of these elements as assembled.

In a preferred embodiment, for 120 volts, 40 turns of coil were used with 14-gauge wire (165 strands of 36-gauge copper Litz wire, useful for high frequencies), with an inductance of 256 μHenries. For 240 volts, 75 turns of coil were used with 18-gauge wire (65 strands of 36-gauge copper Litz wire), with an inductance of 820 μHenries. Typical induction cooking appliance designs will use 120 volt coils with less than 20 turns and inductances typically less than 100 μHenries, and 240 volt coils with less than 30 turns and inductances typically less than 150 μHenries. A useful range of current for the resonant tank of the inverter was found to be 5-11 amps for 120 volts, and 4-8 amps for 240 volts. Typical induction cooking appliance designs will have coil currents in the rage of 25-50 amps or more.

Figure 9:
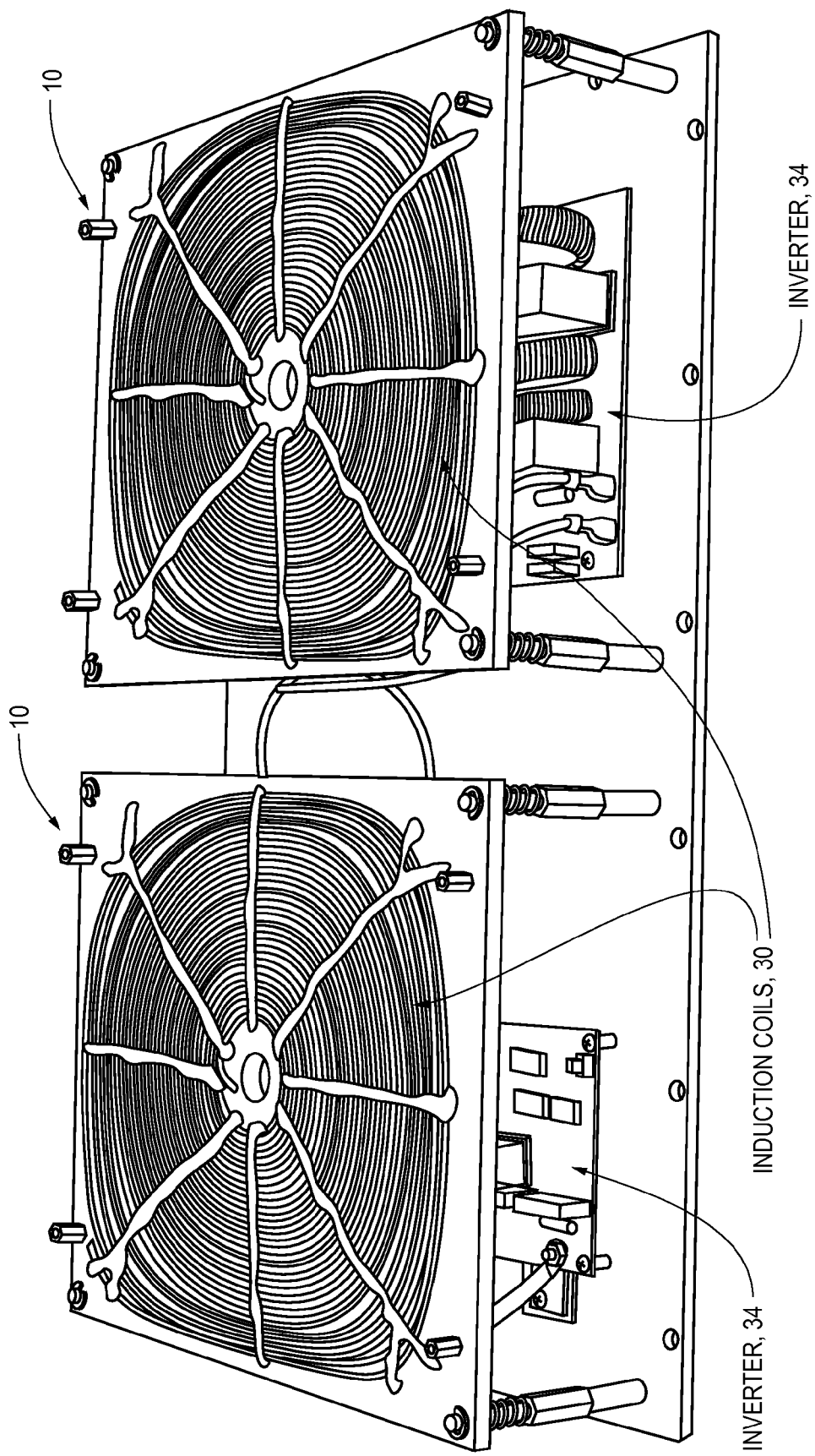
FIG. 9 is a top/side perspective view showing a portion of preferred induction heating units useful for the present invention, including the inverters and induction coils.
Figure 10:
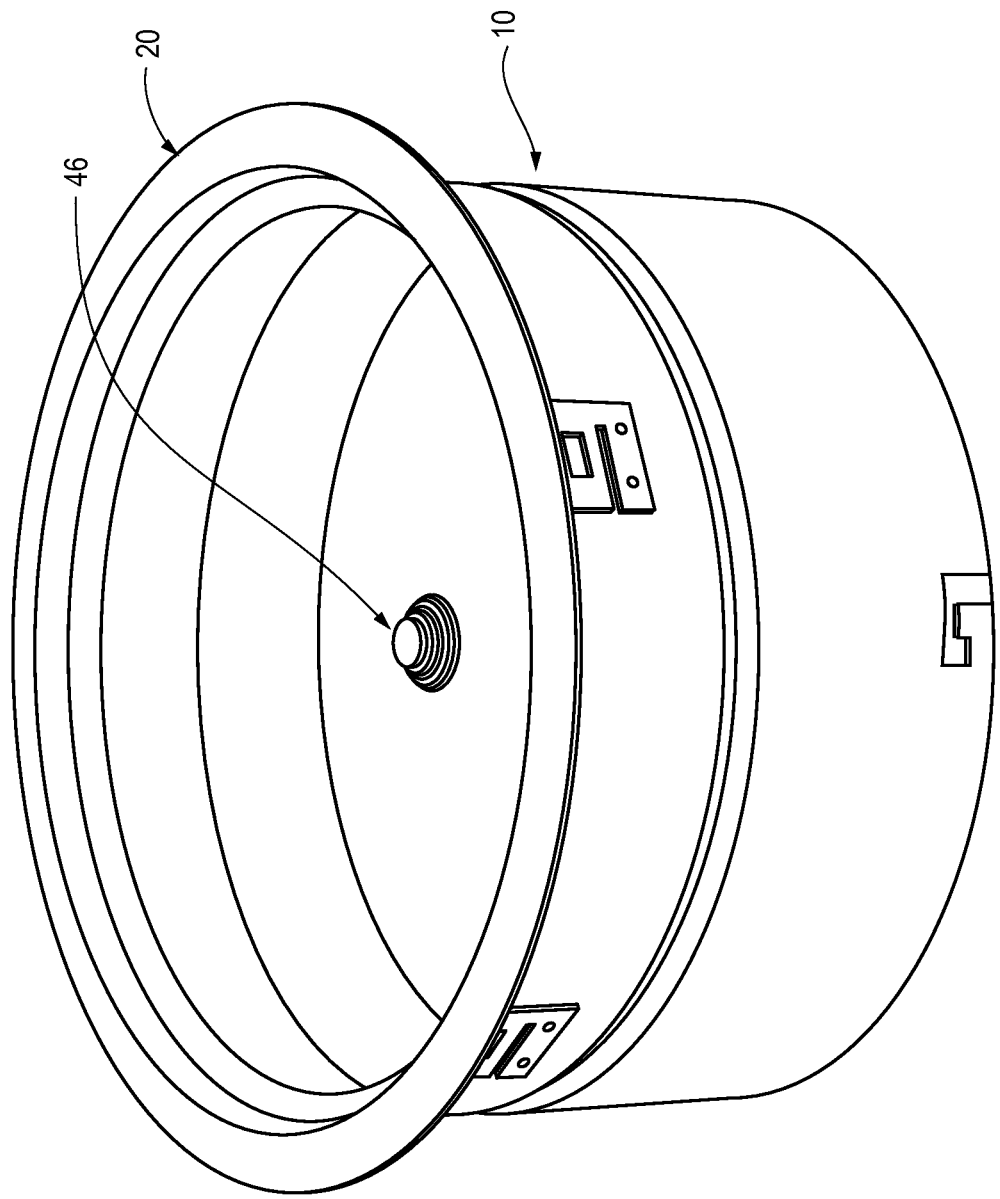
FIG. 10 is a front/top perspective view illustrating a round induction heating unit.
Figure 11:
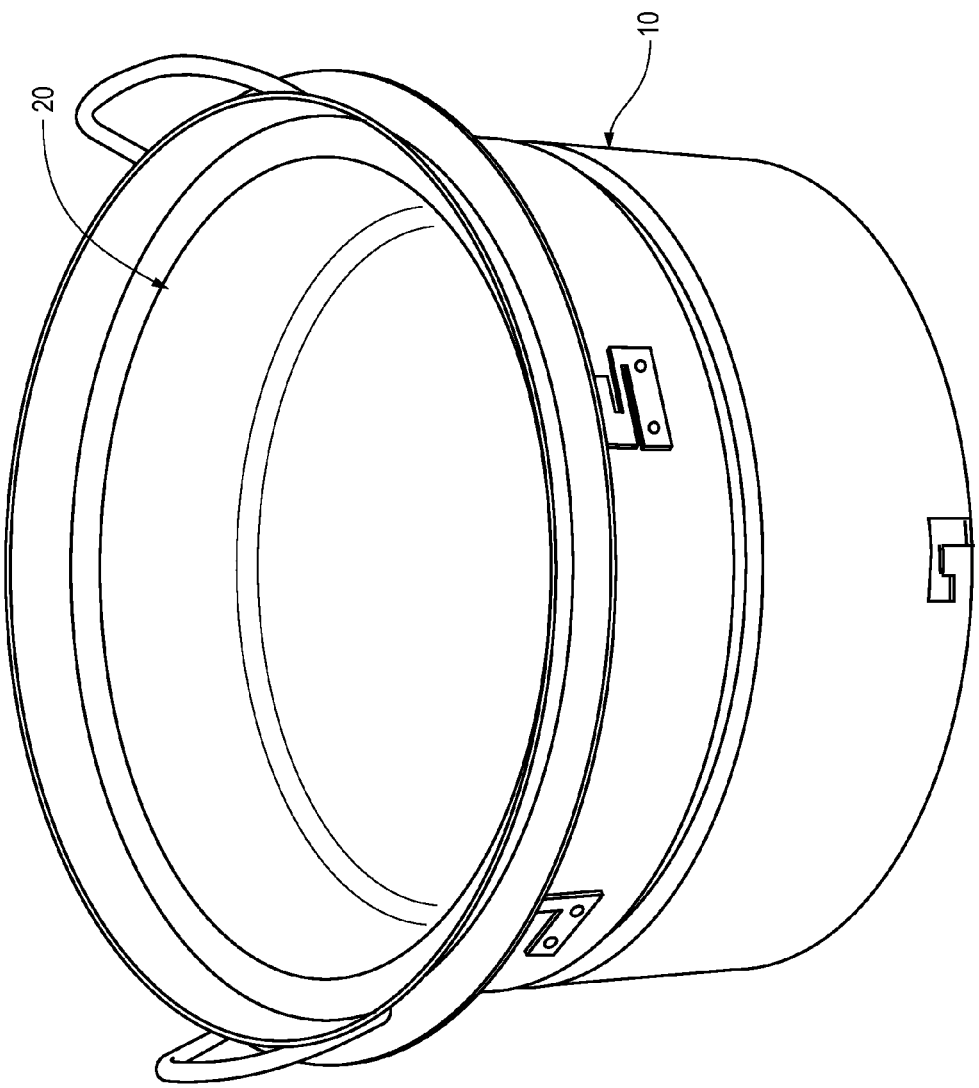
FIG. 11 is a front/top perspective view showing the induction heating unit in FIG. 10 together with a typical round pan/tray for holding/warming food.
Figure 12:
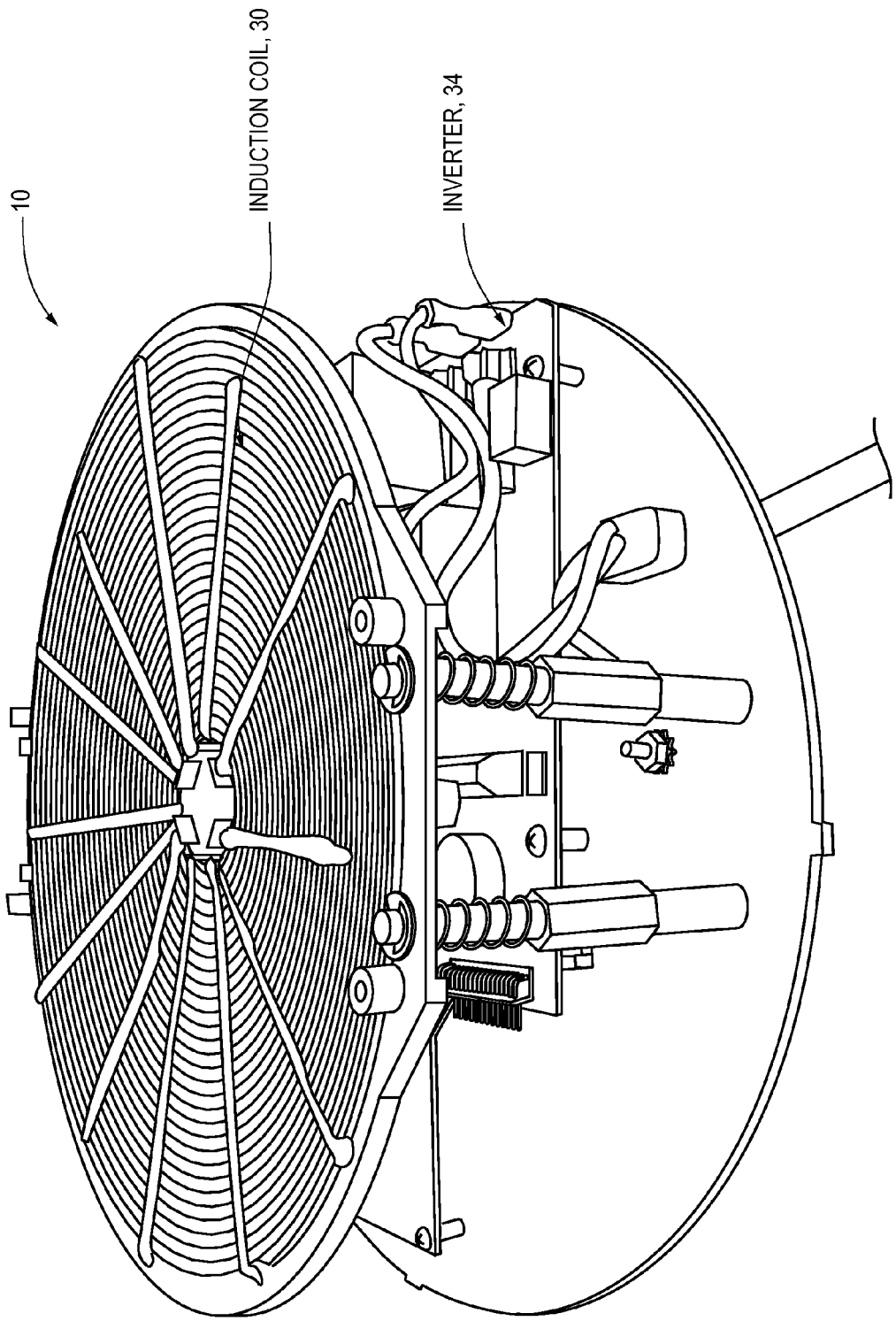
FIG. 12 is a partial front/top perspective showing a preferred inverter inside a round induction heating unit removed from its enclosure.

Referring to FIGS. 7-12 and 16, induction heating units 10 useful in both rectangular and round form are shown, together with corresponding rectangular and round pans/trays 20. As shown in FIGS. 9 and 12, induction heating units 10 may include induction coils 30 and inverter power circuits 34. FIG. 16 shows round induction unit 10, including its inverter 34, its line filter 39, bridge rectifier 37, power transistors 47 for the power circuit 35, resonant capacitor 32, low voltage power supplies 42, and control processor 44.

Figure 13:
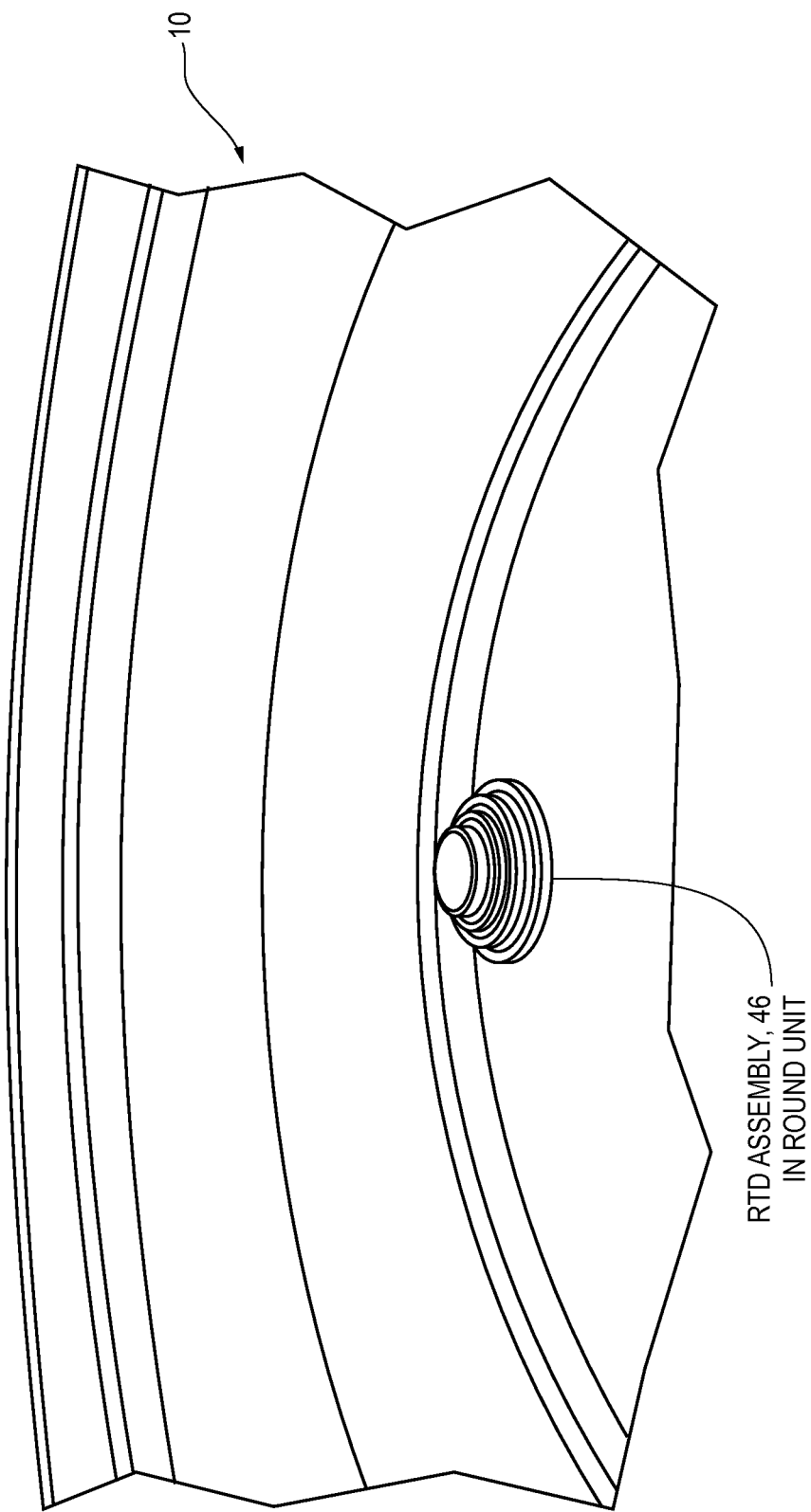
FIG. 13 is a partial, enlarged perspective view of an assembled RTD temperature sensor mounted to a round induction heating unit.
Figure 14:
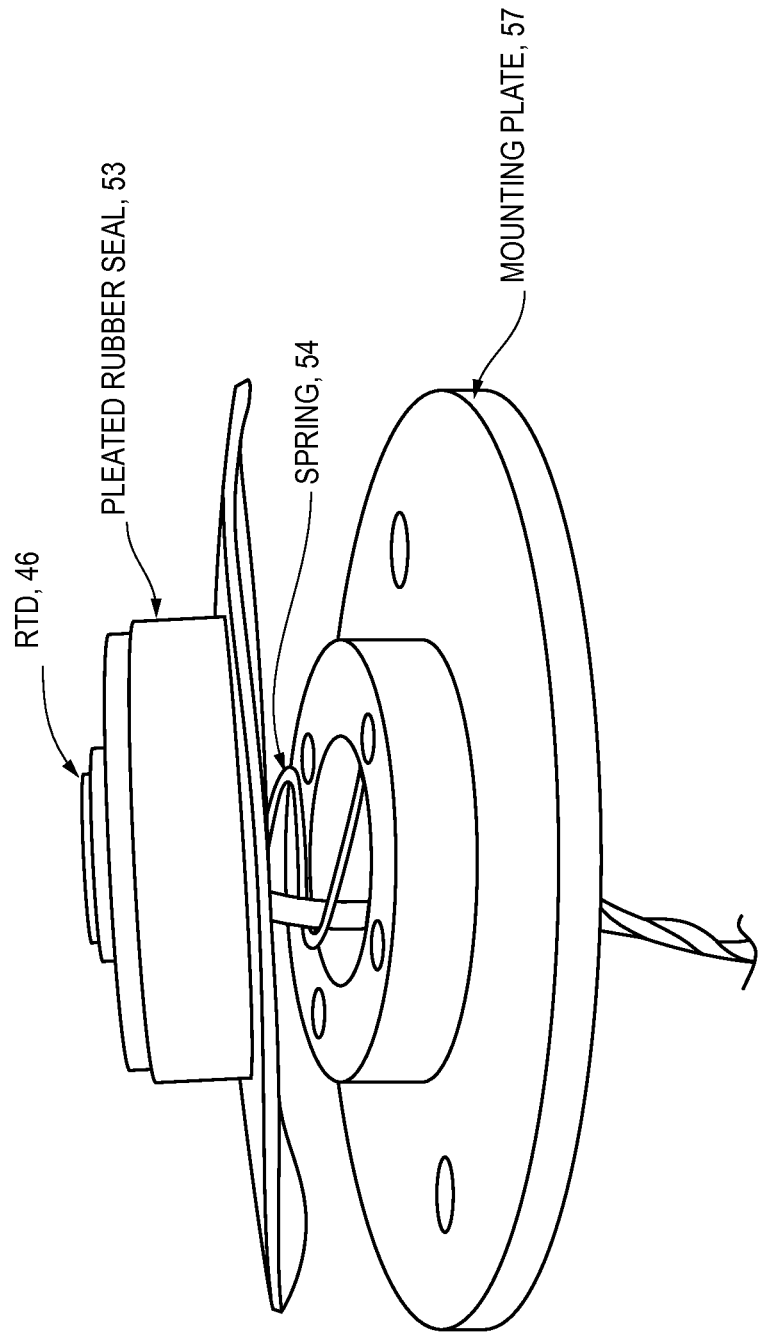
FIG. 14 is an enlarged front perspective parts view of the RTD temperature sensor assembly shown in FIG. 13.
Figure 15:
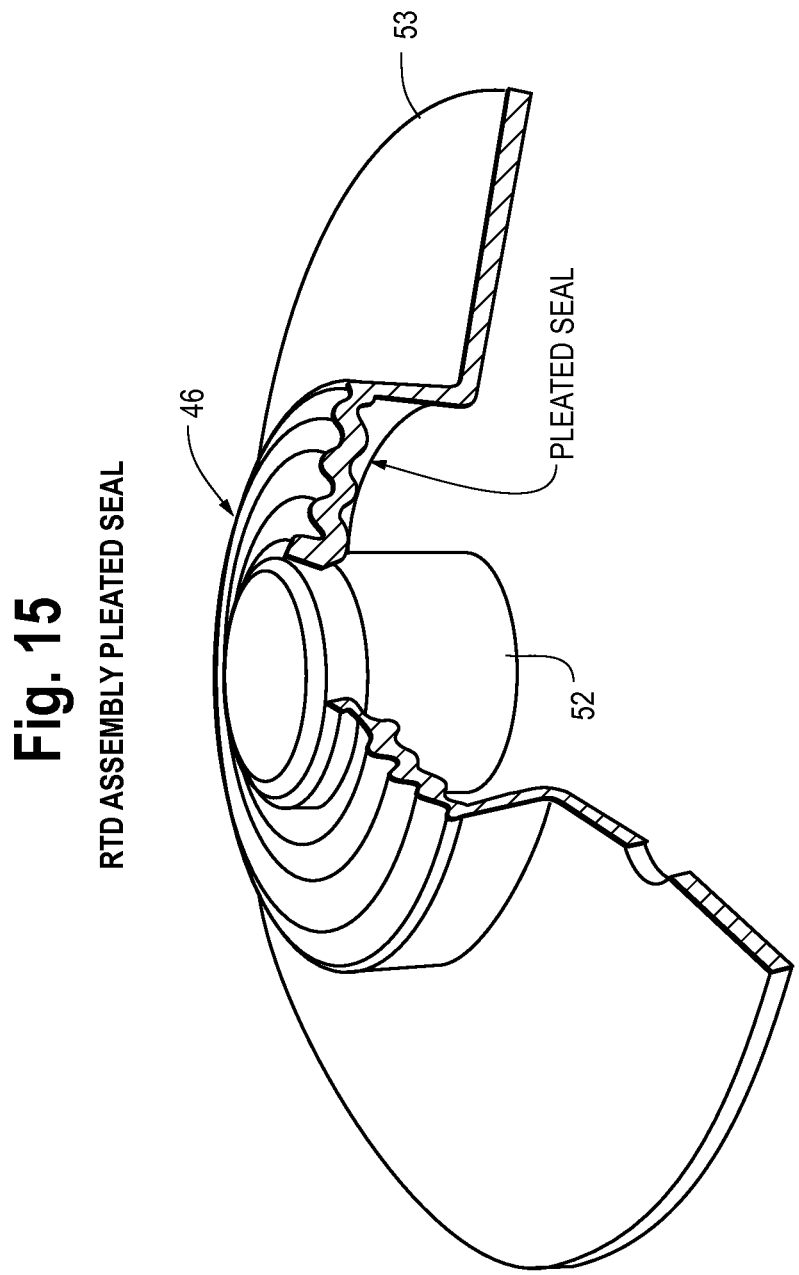
FIG. 15 is a partial front perspective view of the RTD temperature sensor assembly shown in FIG. 14, together with its preferred pleated rubber seal.

Referring now to FIGS. 10 and 13-15, to measure pan or tray temperatures, an RTD (Resistive Thermal Device) temperature sensor 46 may be used, and may be mounted beneath pan or tray 20. A particularly preferred RTD temperature sensor 46 may be housed in a metal can 52 (FIG. 15), which, in turn, may be attached to a pleated rubber gasket seal 53 (FIGS. 13-15). Gasket 53 may be a thin pleated disk, providing both a seal against food and other intrusions, as well as providing a flexible mounting for RTD 46, such that it can freely move up and down. RTD 46 and pleated seal 53 may additionally be mounted in an assembly which includes a spring 54 located underneath the RTD and above mounting plate 57 (FIG. 14, rubber seal 53 removed from mounting plate 57 in this view), allowing the RTD to move up and down while still maintaining contact with the bottom of pan or tray 20. This allows the RTD to maintain pan/tray contact despite variations in the size and shape of the pans/trays and their positioning. Two manufacturers of RTDs that may be used, for example, are Sensortec, Inc. and Heraeus Sensor Technology USA.

The RTD may then operate in a closed loop with pan/tray 20 and the induction unit and its processor and controls (FIG. 1), to maintain desired pan/food temperatures and temperature profiles. By "closed loop" it is meant that the temperature measured by the RTD is used by control processor 44 to determine the on/off and power output level operation of the inverter 34, which, in turn, determines the heating of pan/tray 20. Processor 44 may do so with an algorithm that operates inverter power circuit 34 to achieve a particular temperature profile. For example, the algorithm can be as simple as a comparison to determine whether the temperature is below a threshold temperature, in which case the inverter is instructed to run, or above the threshold, in which case the inverter is turned off. More complicated algorithms may be used if, for example, anticipatory controls are used, custom-designed for particular food characteristics. Particularly in heating 303 stainless steel pans with food to a desired temperature, it is advantageous to ramp the power slowly and accurately to avoid hot spots and allow for adequate lateral heat transfer.

It is preferred that systems of the present invention be able to maintain accurate temperature control at low power levels. The low power levels are required to provide even heating of a 300-series stainless steel pan/tray, or pans/trays made of materials with comparable relative magnetic permeabilities. Without accurate control, the pan/tray may develop severe thermal gradients that can render the temperature holding inadequate. One preferred method disclosed here is to employ a stepped-profile, using multiple thresholds and inverter power levels based on the measured temperature of the pan/tray.

For induction units with a remote control/user interface, a serial bus may be desired to provide a communication protocol between the master controller (main induction unit) and the slave (remote control bus). The existing serial communication architecture is not desirable due to cost, complexity or speed requirements. Accordingly, a custom architecture was developed to provide the following (which may of course be varied, depending upon system needs):

1. Transfer 32 bits of data to be sorted into 4 blocks of 8 bits each from the master to the slave.
2. Transfer 8 bits of serial data from the slave to the master using one of the data lines for sending data to the slave.
3. Perform all of this in less than 10 microseconds.
4. Minimize the number of wires required between master and slave—preferably 6 or fewer.

The architecture developed uses four data lines, one of which is bi-directional, and two control signals. This allows the bus to use a standard Ethernet cable to connect the devices.

Figure 2:
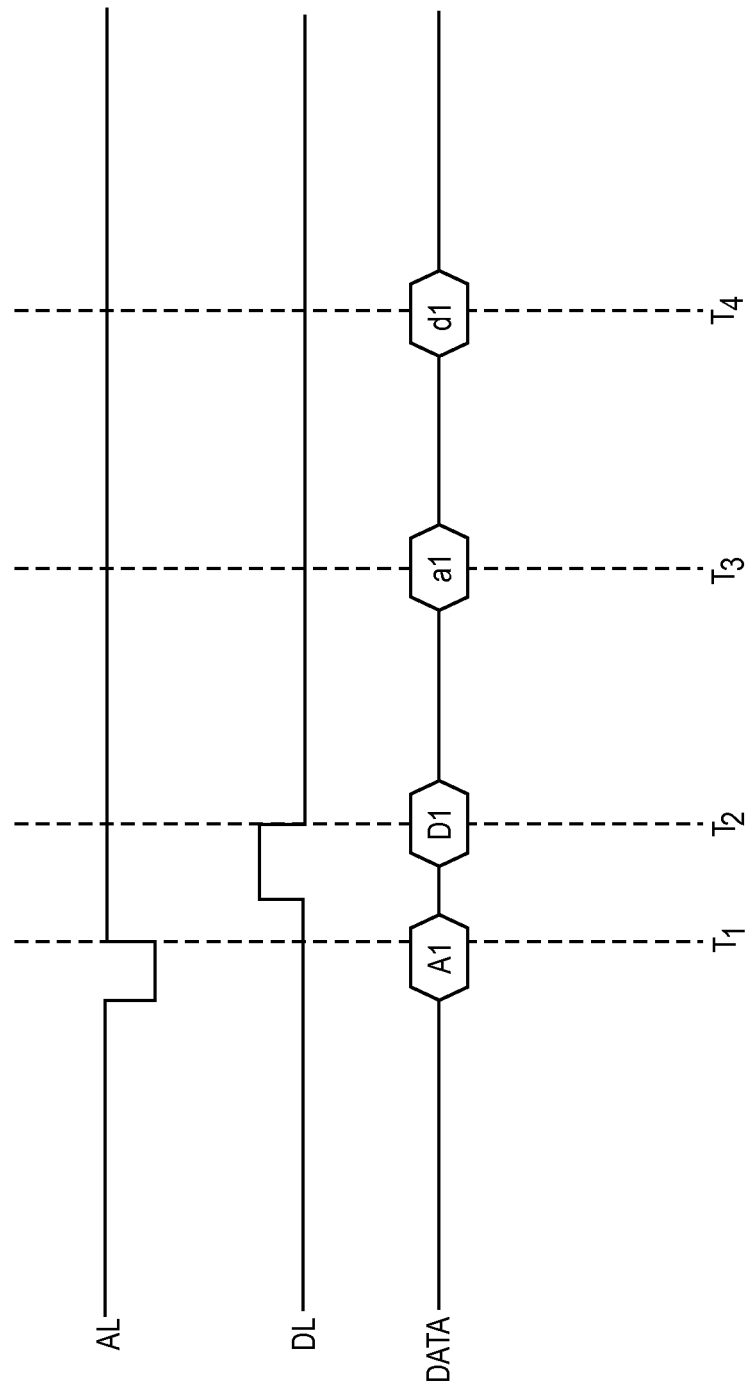
FIG. 2 is a timing diagram illustrating a typical serial bus transaction which may occur using exemplary architecture for the communication protocol between a master controller (main induction unit) and its slave (remote control box), forming a preferred embodiment of the present invention.

The first control signal, AL, may latch the address, or segment of the 32 bits of data being sent on the positive edge of the signal. The second control signal, DL, may latch the actual data for that segment on the negative edge of the signal. When AL and DL are in opposing states, the master can use three of the four data lines to request one bit of the data returned from the slave. The three data lines may be used to select the bit the master is requesting and the fourth line may be used to transmit the data back to the master. A typical bus transaction may require 16 "writes" by the master to the slave and 8 "reads." Referring to FIG. 2, the time at: $T_1$ may indicate the address for the next byte or word saved by the slave; $T_2$ may show that data is saved to address $A_1$; $T_3$ may indicate that the master requests data bit $d_2$ from the slave; and $T_4$ may indicate that the slave sends data bit $d_2$ back.

Figure 17:
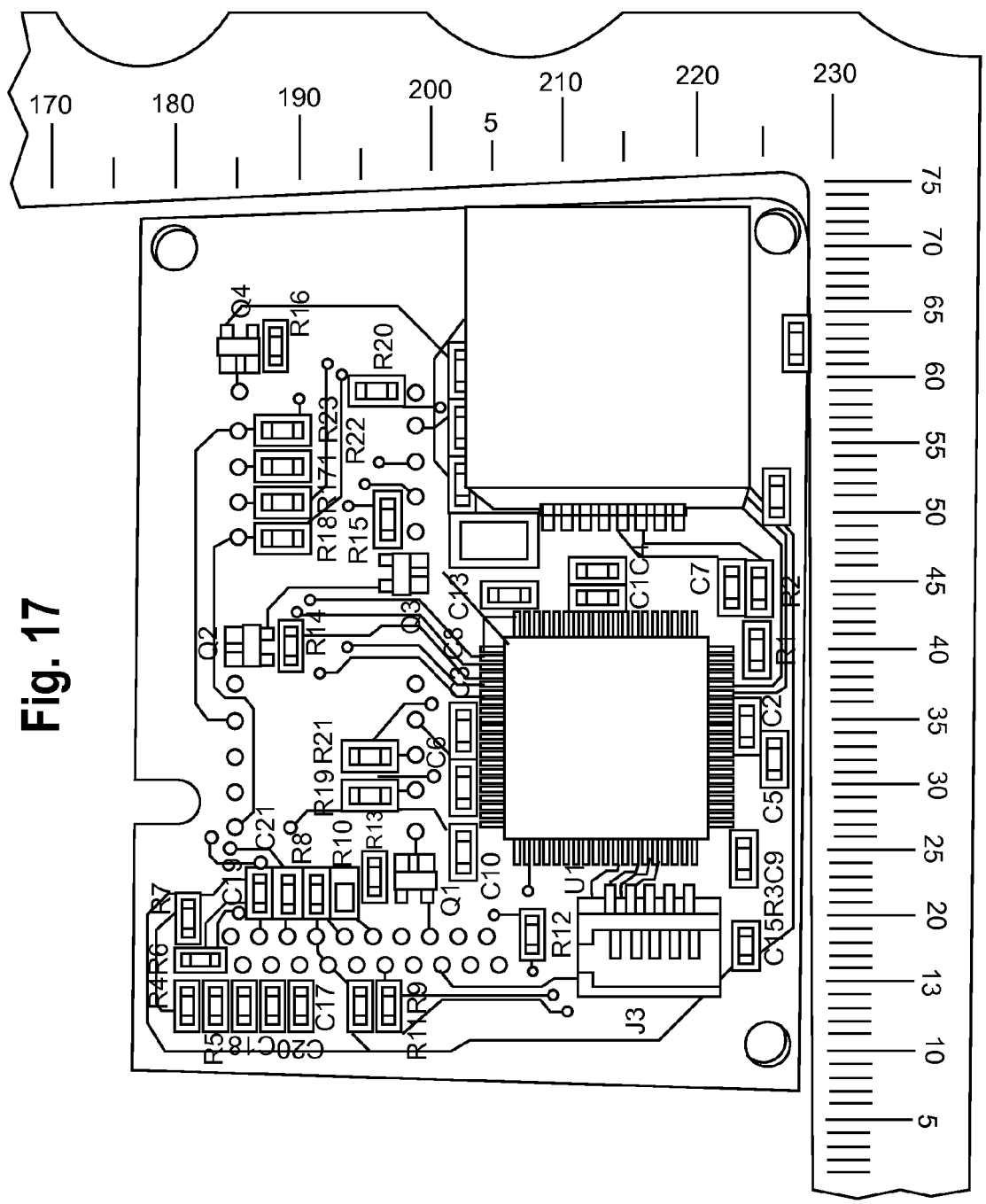
FIG. 17 is a rear perspective view of the slave hardware shown in the schematic diagram of FIG. 3.

In this system the data may be used to drive a 4-digit, 7-segment display light-emitting-diode (LED) display, and 4 discrete LED indicators (see, e.g., FIG. 17, showing one exemplary display board). The latched data output to the slave may be saved and multiplexed to the display by an independent circuit on the slave controller.

The benefit of latching the data allows the master to off-load the processing cycles required to multiplex the display, and can reduce its cost or allow for additional functions to be performed. Additionally, because the data is broken into pieces, and in the normal course of operating the unit, the master does not need to update all 32 bits of the data, the bus architecture allows the master to update only those portions of the data that are required, further reducing the processing requirements of the master.

To achieve a smaller size, the slave can be implemented with a programmable device that allows discrete logic to be configured internally and combined with an integrated microprocessor. Such a device allows bus architecture to be expandable to up to 64 bits and can drive more complex displays, such as alphanumeric modes.

A slave device which may be used in this application is a Cypress Semiconductor product called a Programmable System On A Chip (PSoC). The CY8C32 family of parts may be used, for example. The master end may be implemented with a PSoC device; alternatively, a microcontroller, such as Microchip part number PIC18F2525, may be used, although almost any microcontroller will be able to perform these functions provided it can also handle the functions of controlling the inverter.

Figure 3:
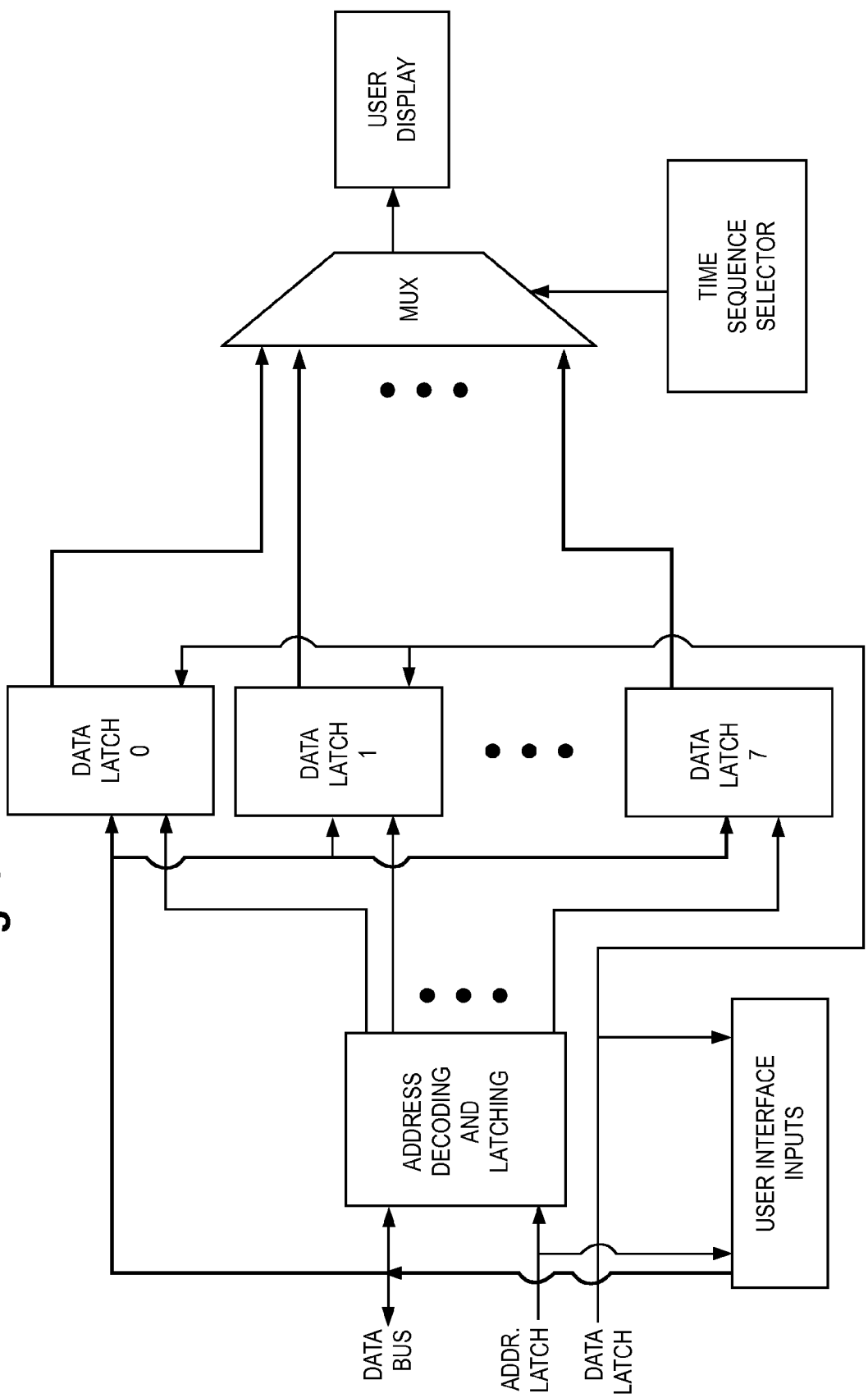
FIG. 3 is a schematic diagram illustrating slave hardware which may be used to utilize the bus signals, according to a preferred embodiment of the invention.
Figure 4:
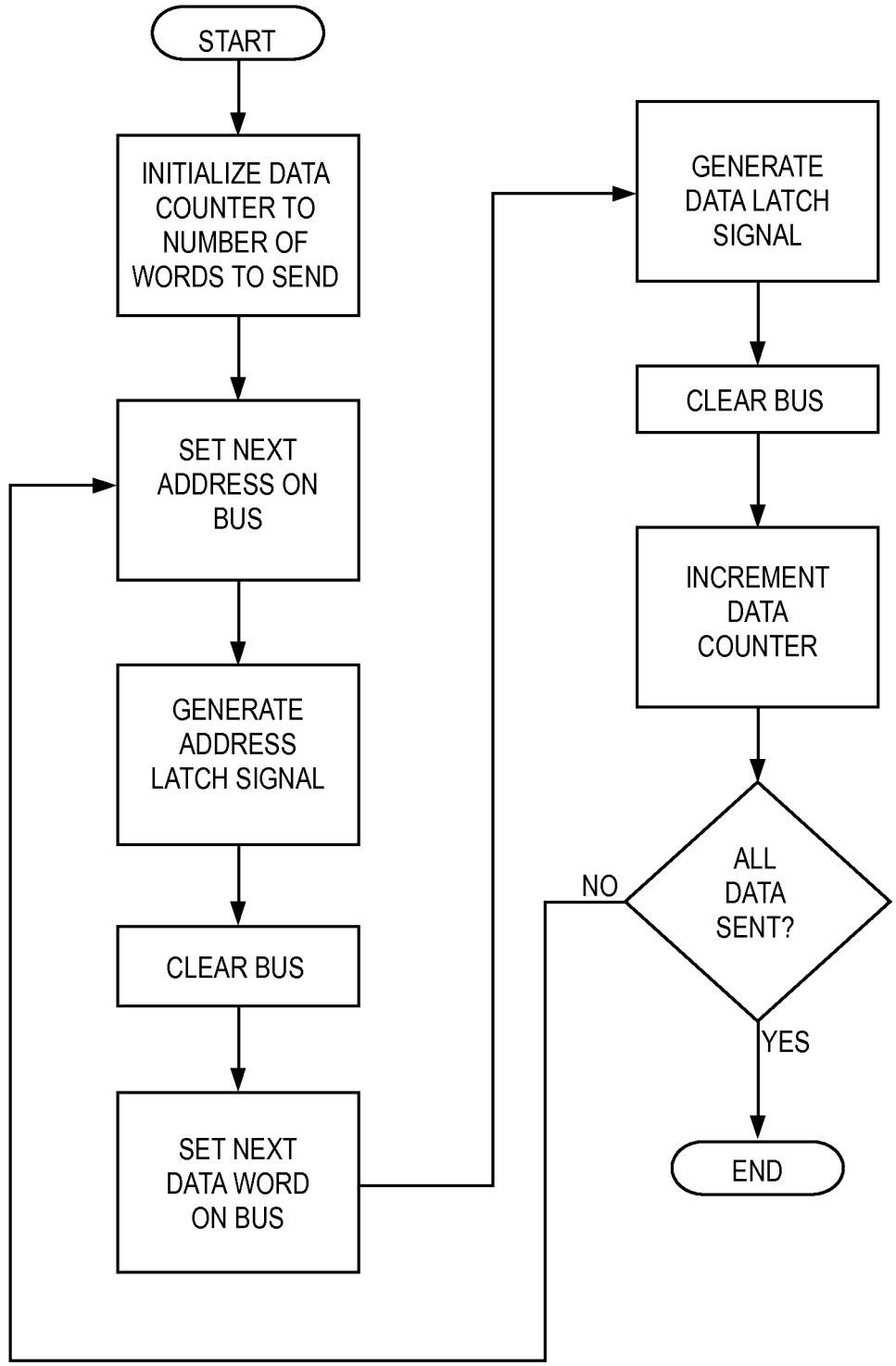
FIG. 4 is a flow chart illustrating an exemplary process for the master controller for transmitting data on the bus, according to a preferred embodiment of the invention.
Figure 5:
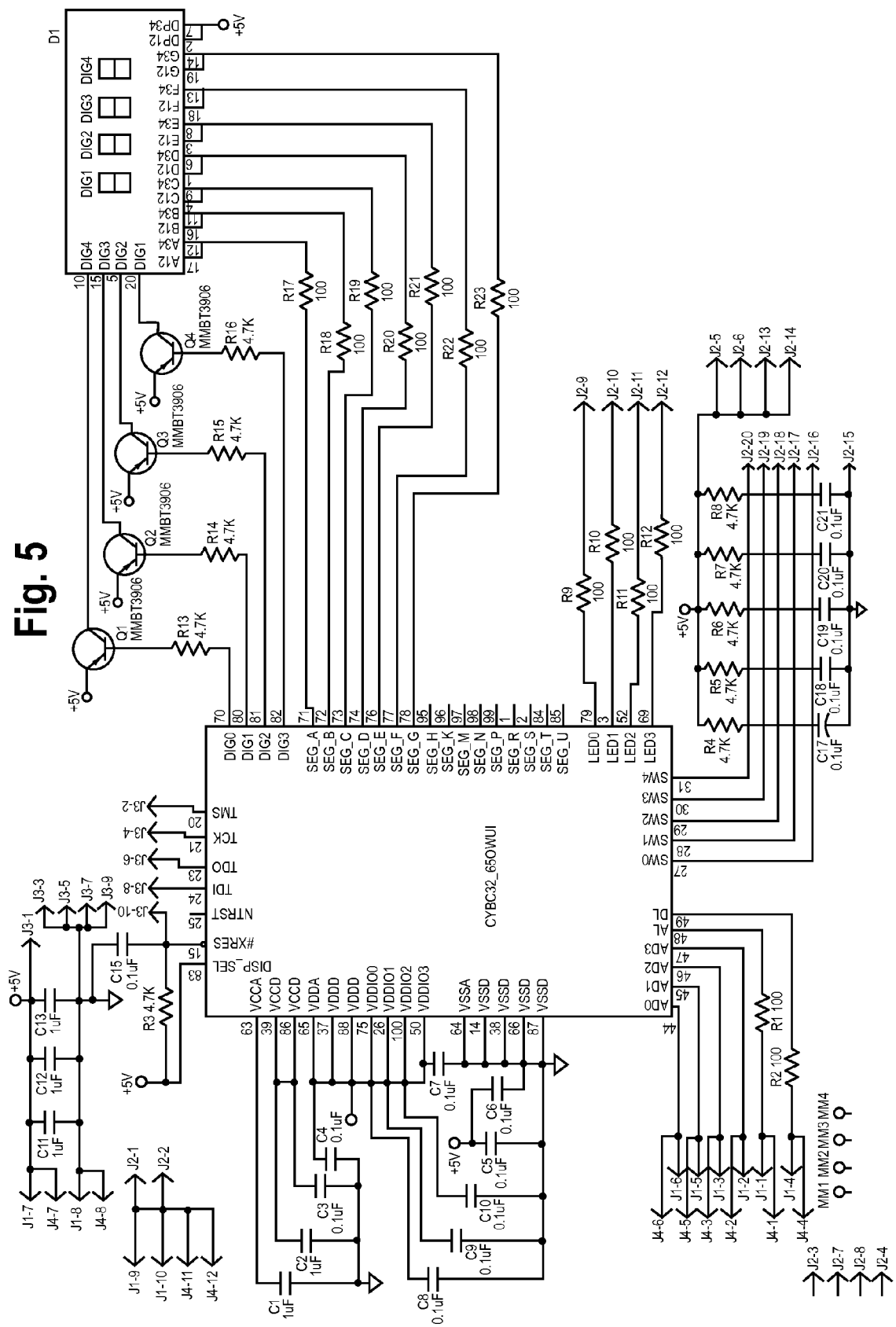
FIG. 5 is a schematic diagram illustrating one embodiment of slave hardware for using the bus signals.
Figure 6:
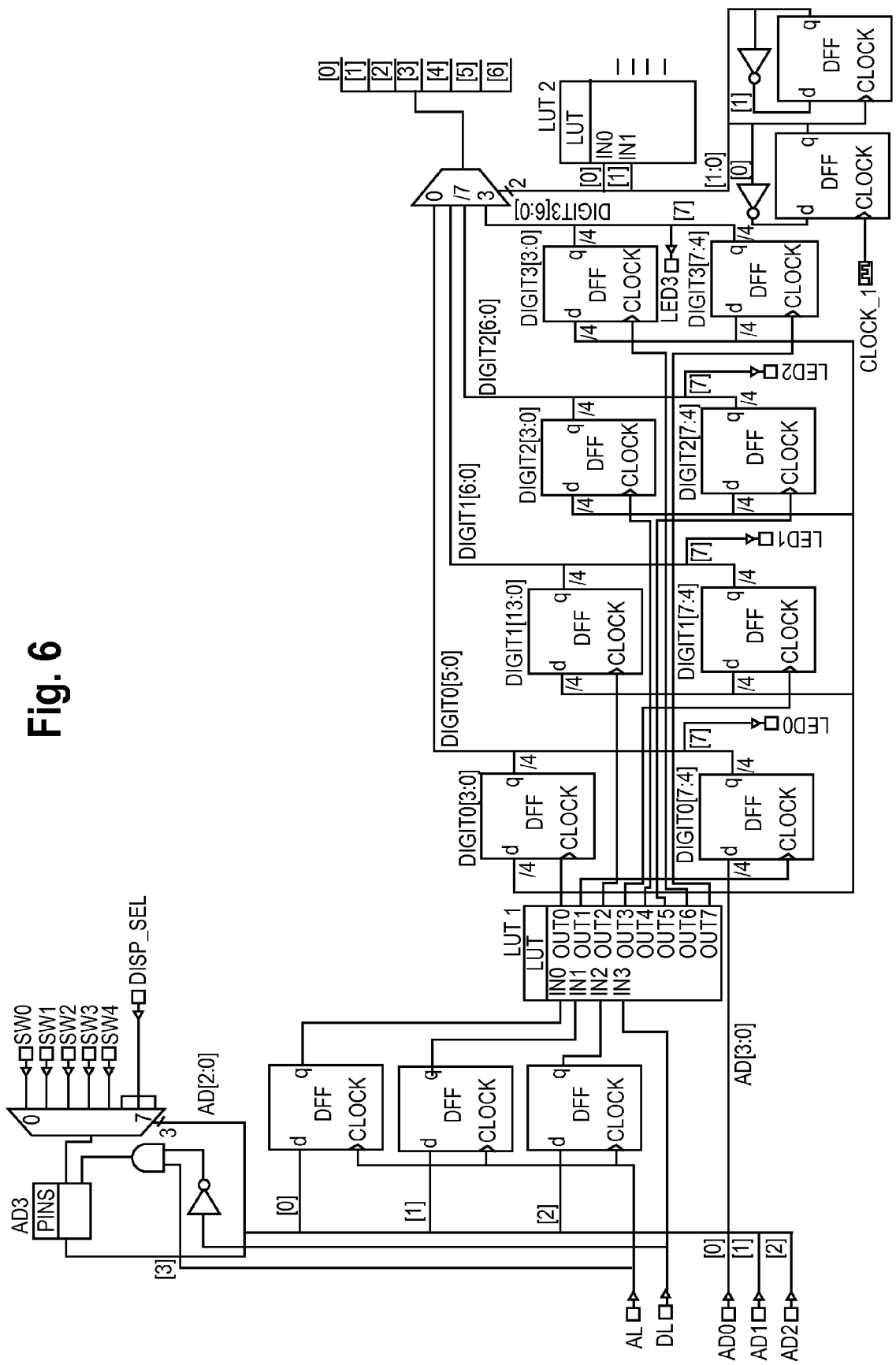
FIG. 6 is a schematic representation of an embodiment illustrating an internal configuration of a programmable device required to construct the slave hardware, according to a preferred embodiment of the invention.
Figure 7:
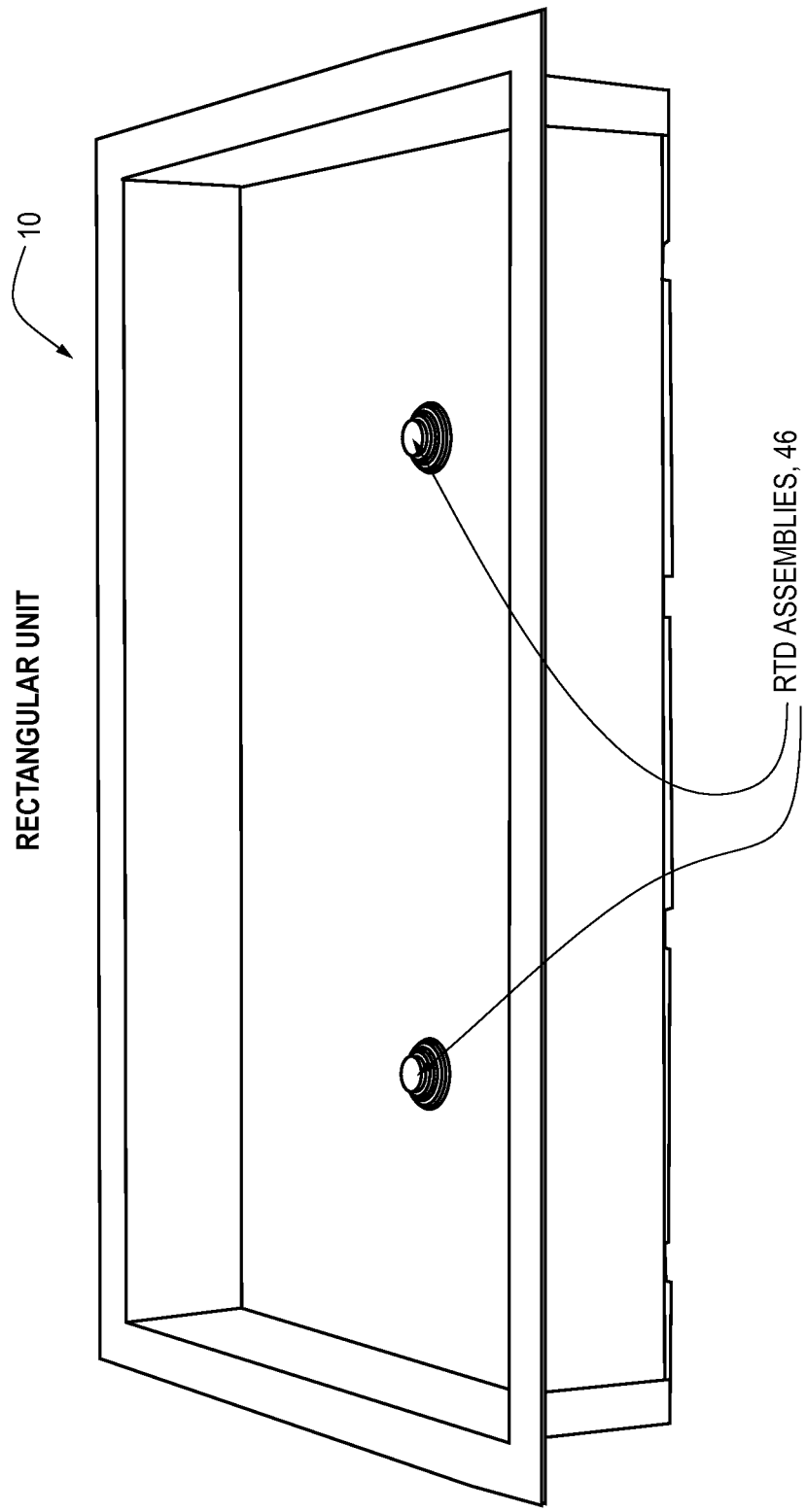
FIG. 7 is a top/side perspective view of a rectangular induction heating unit including exemplary RTD assemblies in a preferred embodiment of the invention.
Figure 8:
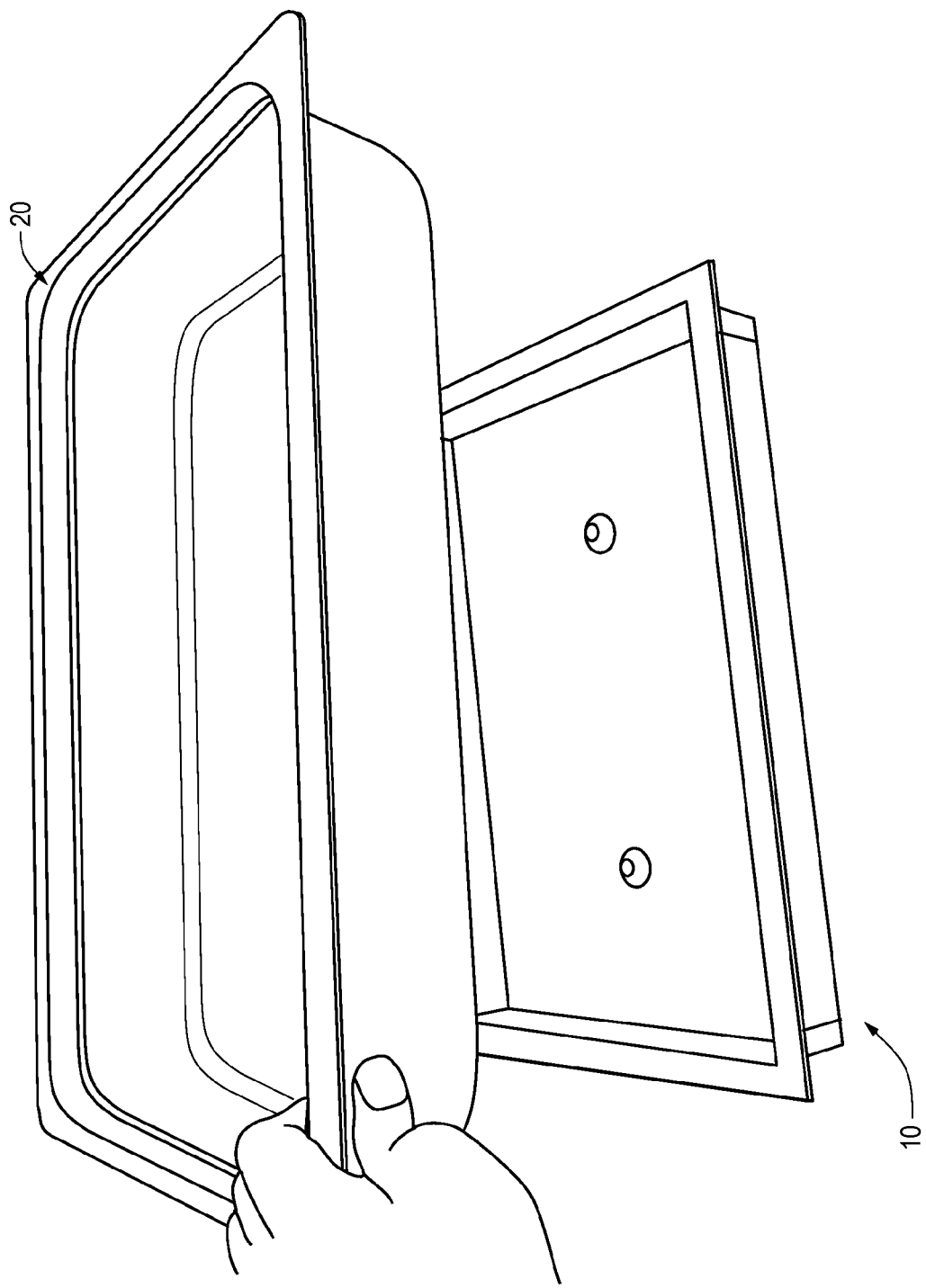
FIG. 8 is a top/side perspective view similar to FIG. 7 and also showing a typical food holding/warming tray/pan.

Referring to FIG. 3, a schematic diagram showing exemplary slave hardware for using the bus signals in a preferred embodiment is shown. FIG. 4 is a flow chart showing an exemplary process for the master controller to transmit data on the bus, for the preferred embodiment. FIGS. 5 and 6 are schematic diagrams of exemplary configuration for the slave device.

The above description is not intended to limit the meaning of the words used in the following claims that define the invention. For example, while various preferred and less preferred embodiments have been described above, persons of ordinary skill in the art will understand that a variety of other designs still falling within the scope of the following claims may be envisioned and used. It is contemplated that future modifications in structure, function or result will exist that are not substantial changes and that all such insubstantial changes in what is claimed are intended to be covered by the claims.

We claim:

1. A system for holding and warming food, comprising:
    a container for holding and warming food, the container consisting of 300-series stainless steel; and
    an induction heating unit with an induction heating circuit for induction heating the container, the induction heating circuit including an induction coil having 40 or more turns of a 120 volt coil, wherein the induction coil operates at a current of 5-11 amperes.

2. The system of claim 1, wherein the induction coil comprises 14 gauge wire.

3. The system of claim 1, further comprising a device for measuring the temperature of the container.

4. The system of claim 3, wherein the measured temperature is used in a closed loop control to limit and maintain the temperature of the container at a desired value.

5. The system of claim 4 wherein the measured temperature is used to generate a ramped inverter power profile facilitating lateral heat transfer in the container.

6. The system of claim 3, wherein the device for measuring the temperature of the container is mounted beneath the container in a manner to facilitate maintaining contact with the container despite variations in shape or size of the container.

7. The system of claim 1, wherein the container is induction-heated in a manner that minimizes internal heat generation within the induction heating unit and thereby enables induction heating without the need for a cooling fan.

8. A system for holding and warming food, comprising:
    a container for holding and warming food, the container consisting of 300-series stainless steel; and
    an induction heating circuit for induction heating the container, the induction heating circuit including an induction coil having 75 or more turns of a 240 volt coil, wherein the induction coil operates at a current of 4-8 amperes.

9. The system of claim 8, further comprising a device for measuring the temperature of the container.

10. An apparatus for warming food in a 300-series stainless steel container, the apparatus comprising:
    an induction heating unit for heating the container by induction heating, the induction heating unit including an inverter power circuit, power circuit controls, and an induction coil, the induction coil having 40 or more turns of a 120 volt coil and an inductance of at least 250 µHenries, wherein the induction coil operates at a current of 5-11 amperes, and wherein the container consists of 300-series stainless steel.

11. The apparatus of claim 10, wherein the inverter power circuit includes a resonant capacitor.

12. The system of claim 1, wherein the induction coil has an inductance of at least 250 µHenries.

13. The system of claim 3, wherein the device for measuring the temperature of the container comprises a resistive thermal device.

14. The system of claim 9, wherein the device for measuring the temperature of the container comprises a resistive thermal device.

15. An apparatus for warming food in a 300-series stainless steel container, the apparatus comprising:
    an induction heating unit with an induction heating circuit for induction heating the container, the induction heating circuit including an induction coil having 75 or more turns of a 240 volt coil and an inductance of at least 800 µHenries, wherein the induction coil operates at a current of 4-8 amperes, wherein the container consists of 300 series stainless steel.

16. The apparatus of claim 15, wherein the induction coil comprises 18 gauge wire.

17. The system of claim 8, wherein the induction coil has an inductance of at least 800 µHenries.

18. The apparatus of claim 10, wherein the induction coil comprises 14 gauge wire.

19. A system for holding and warming food, comprising:
    a container for holding and warming food, the container consisting of 300-series stainless steel; and an induction heating unit with an induction heating circuit for induction heating the container, the induction heating circuit including an induction coil having an inductance of at least 250 μHenries for a 120 volt coil, wherein the induction coil operates at a current of 5-11 amperes.

20. The system of claim 19, wherein the coil has 40 or more turns.

21. The system of claim 19, wherein the coil comprises 14 gauge wire.

22. A system for holding and warming food, comprising:
a container for holding and warming food, the container consisting of 300-series stainless steel; and
an induction heating unit with an induction heating circuit for induction heating the container, the induction heating circuit including an induction coil having an inductance of at least 800 μHenries for a 240 volt coil, wherein the induction coil operates at a current of 4-8 amperes.

23. The system of claim 22, wherein the coil has 75 or more turns.

24. The system of claim 22, wherein the coil comprises 18 gauge wire.

\* \* \* \* \*